United States Patent
Nestares et al.

(10) Patent No.: US 9,148,582 B2
(45) Date of Patent: Sep. 29, 2015

(54) METHOD AND SYSTEM FOR PERFECT SHOT IMAGING FROM MULTIPLE IMAGES

(75) Inventors: Oscar Nestares, San Jose, CA (US); Kalpana Seshadrinathan, Sunnyvale, CA (US); Maha El Choubassi, San Jose, CA (US); Richard T. Beckwith, Hillsboro, OR (US); Sung Hee Park, Stanford, CA (US)

(73) Assignee: Intel Corporation, Santa Clara, CA (US)

( * ) Notice: Subject to any disclaimer, the term of this patent is extended or adjusted under 35 U.S.C. 154(b) by 179 days.

(21) Appl. No.: 13/538,983

(22) Filed: Jun. 29, 2012

(65) Prior Publication Data

US 2014/0002693 A1    Jan. 2, 2014

(51) Int. Cl.
*H04N 5/235* (2006.01)
*H04N 5/265* (2006.01)
*H04N 5/232* (2006.01)

(52) U.S. Cl.
CPC ......... *H04N 5/2356* (2013.01); *H04N 5/23222* (2013.01); *H04N 5/265* (2013.01); *H04N 5/2351* (2013.01)

(58) Field of Classification Search
None
See application file for complete search history.

(56) References Cited

U.S. PATENT DOCUMENTS

| | | | |
|---|---|---|---|
| 7,071,987 B1 * | 7/2006 | Tanaka | 348/362 |
| 7,978,248 B2 * | 7/2011 | Terashima | 348/333.05 |
| 8,264,564 B2 * | 9/2012 | Kita | 348/222.1 |
| 8,432,474 B2 * | 4/2013 | Nagoya | 348/333.02 |
| 8,736,703 B2 * | 5/2014 | Iwamoto et al. | 348/222.1 |
| 2003/0095192 A1 * | 5/2003 | Horiuchi | 348/222.1 |
| 2004/0095472 A1 * | 5/2004 | Yoshida et al. | 348/208.12 |
| 2005/0264669 A1 * | 12/2005 | Ota | 348/333.12 |
| 2006/0007327 A1 * | 1/2006 | Nakamura et al. | 348/239 |
| 2006/0192879 A1 * | 8/2006 | Hisamatsu | 348/333.01 |
| 2006/0216016 A1 * | 9/2006 | Eun | 396/222 |
| 2006/0250515 A1 * | 11/2006 | Koseki et al. | 348/362 |
| 2007/0058064 A1 * | 3/2007 | Hara et al. | 348/333.01 |
| 2007/0065137 A1 * | 3/2007 | Hara et al. | 396/291 |
| 2007/0081082 A1 * | 4/2007 | Watanabe et al. | 348/222.1 |
| 2007/0103562 A1 * | 5/2007 | Kaneko et al. | 348/222.1 |
| 2007/0147824 A1 * | 6/2007 | Hamamura | 396/213 |
| 2008/0036870 A1 * | 2/2008 | Uezono | 348/222.1 |
| 2008/0088710 A1 * | 4/2008 | Iwamoto et al. | 348/220.1 |
| 2008/0170847 A1 * | 7/2008 | Flannery | 396/222 |
| 2008/0175579 A1 * | 7/2008 | Kawakami | 396/155 |
| 2008/0297622 A1 * | 12/2008 | Miyashita | 348/229.1 |
| 2009/0015681 A1 * | 1/2009 | Pipkorn | 348/208.12 |
| 2009/0021594 A1 * | 1/2009 | Tsuda et al. | 348/222.1 |
| 2009/0059057 A1 * | 3/2009 | Long et al. | 348/343 |
| 2009/0073285 A1 * | 3/2009 | Terashima | 348/231.99 |
| 2009/0091633 A1 * | 4/2009 | Tamaru | 348/208.14 |
| 2009/0115856 A1 * | 5/2009 | Washisu | 348/208.1 |
| 2009/0128640 A1 * | 5/2009 | Yumiki | 348/208.6 |
| 2009/0160968 A1 * | 6/2009 | Prentice et al. | 348/223.1 |
| 2009/0167877 A1 * | 7/2009 | Imamura | 348/208.4 |
| 2009/0195686 A1 * | 8/2009 | Shintani | 348/333.11 |
| 2010/0026843 A1 * | 2/2010 | Tezuka et al. | 348/231.2 |
| 2010/0073529 A1 * | 3/2010 | Uchida | 348/262 |

(Continued)

*Primary Examiner* — Michael Osinski
(74) *Attorney, Agent, or Firm* — Buckley, Maschoff & Talwalkar LLC

(57) ABSTRACT

An image processing apparatus, system, and method to automatically determine a plurality of image acquisition settings for an scene; acquire a set of images of the scene, the set of images including multiple images acquired with a distinct plurality of the determined image acquisition settings; and generate a single image by combining the acquired set of images.

17 Claims, 6 Drawing Sheets

(56) References Cited

U.S. PATENT DOCUMENTS

| | | | |
|---|---|---|---|
| 2010/0134644 A1* | 6/2010 | Kita | 348/222.1 |
| 2010/0194963 A1* | 8/2010 | Terashima | 348/333.11 |
| 2010/0238324 A1* | 9/2010 | Toyoda | 348/239 |
| 2010/0259636 A1* | 10/2010 | Tzur et al. | 348/222.1 |
| 2011/0211732 A1* | 9/2011 | Rapaport | 382/107 |
| 2012/0051727 A1* | 3/2012 | Tanaka | 396/49 |
| 2012/0098989 A1* | 4/2012 | Sugawara | 348/222.1 |
| 2012/0177352 A1* | 7/2012 | Pillman et al. | 396/61 |
| 2012/0274801 A1* | 11/2012 | Oyachi | 348/222.1 |
| 2012/0274830 A1* | 11/2012 | Kameyama et al. | 348/333.02 |
| 2012/0307103 A1* | 12/2012 | Kunishige et al. | 348/223.1 |
| 2013/0044254 A1* | 2/2013 | Tzur | 348/345 |

* cited by examiner

100

PLANNING STAGE
105

↓

IMAGE ACQUISITION STAGE
110

↓

IMAGE OUTPUT STAGE
115

AUTOMATICALLY DETERMINE IMAGE
ACQUISITION SETTINGS FOR A SCENE THAT MAY RESULT
IN A PLURALITY OF IMAGE ACQUISITION SETTINGS
205

ACQUIRE A SET OF IMAGES BASED ON THE DETERMINED
IMAGE ACQUISITION SETTINGS
210

GENERATE A SINGLE SHOT REPRESENTATION BY COMBINING
THE ACQUIRED SET OF IMAGES
215

```
┌─────────────────────────────────────────────────────┐
│                                                     │
│          AUTOMATICALLY DETERMINE IMAGE              │
│   ACQUISITION SETTINGS FOR A SCENE THAT MAY RESULT  │
│      IN A PLURALITY OF IMAGE ACQUISITION SETTINGS   │
│                                                 305 │
└─────────────────────────────────────────────────────┘
                          │
                          ▼
┌─────────────────────────────────────────────────────┐
│                                                     │
│      ACQUIRE A SET OF IMAGES BASED ON THE DETERMINED│
│              IMAGE ACQUISITION SETTINGS             │
│                                                 310 │
└─────────────────────────────────────────────────────┘
                          │
                          ▼
┌─────────────────────────────────────────────────────┐
│                                                     │
│       PROVIDE AN OUTPUT OF THE ACQUIRED SET OF IMAGES│
│                                                 315 │
└─────────────────────────────────────────────────────┘
```

```
┌─────────────────────────────────────────────┐
│         AUTOMATICALLY DETERMINE IMAGE       │
│  ACQUISITION SETTINGS FOR A SCENE THAT MAY  │
│  RESULT IN A PLURALITY OF IMAGE ACQUISITION │
│                   SETTINGS                  │
│                                         405 │
└─────────────────────────────────────────────┘
                       │
                       ▼
┌─────────────────────────────────────────────┐
│      ACQUIRE A SET OF IMAGES BASED ON THE   │
│         DETERMINED IMAGE ACQUISITION        │
│                   SETTINGS                  │
│                                         410 │
└─────────────────────────────────────────────┘
          │                          │
          ▼                          ▼
┌──────────────────┐         ┌──────────────────┐
│ GENERATE A SINGLE│         │ PROVIDE AN OUTPUT│
│ SHOT REPRESENTA- │         │ OF THE ACQUIRED  │
│      TION        │         │  SET OF IMAGES   │
│              415 │         │              420 │
└──────────────────┘         └──────────────────┘
```

*FIG. 4*

METHOD AND SYSTEM FOR PERFECT SHOT IMAGING FROM MULTIPLE IMAGES

BACKGROUND

When capturing an image using a conventional automatic mode of current cameras, camera phones, and other devices, the camera attempts to set the acquisition parameters such as exposure, focus, and white balance for the user. The automatic mode of operation attempts to obtain an optimal result in the captured image. However, due to limitations in the optics (e.g., depth of field) and sensor (e.g., sensitivity, dynamic range, etc.) of the camera, the images actually produced by the camera's automatic mode of operation are often images that are suboptimal in some aspects. For example, some objects in the resulting image may be in focus while others are out of focus due to the limited depth of field of the optical system. In high dynamic range scenes containing very bright and very dark regions the sensor might not be able to capture all regions at the same time due to the limited dynamic range of the sensor. In some instances low light scenarios may result in noise dominating the captured image if the exposure time is minimized in an attempt to avoid introducing motion blur.

As such, current camera automatic modes and techniques are often times insufficient to produce a good quality image that accurately represents the captured scene. Additionally, the current camera automatic modes and techniques only produce a single, static image, which cannot be later re-experienced under different conditions (e.g., re-focusing to different objects of interest). Furthermore, the heretofore proposed partial solutions for addressing the imaging problems above typically operate by acquiring multiple images with fixed parameters within a fixed interval or range of values determined by the automatic modes. It is also noted that a user must usually actively and specifically select a particular mode of camera operation in order to address a specific imaging situation that may be problematic for a conventional automatic mode. However, such a selection requires the user recognize the need to select the specific mode of operation and then make the camera mode change that will start the specific mode of operation before taking a picture.

BRIEF DESCRIPTION OF THE DRAWINGS

Aspects of the present disclosure herein are illustrated by way of example and not by way of limitation in the accompanying figures. For purposes related to simplicity and clarity of illustration rather than limitation, aspects illustrated in the figures are not necessarily drawn to scale. Further, where considered appropriate, reference labels have been repeated among the figures to indicate corresponding or analogous elements.

FIG. 1 is a flow diagram of a process, in accordance with one embodiment.

FIG. 2 is a flow diagram of a process, in accordance with one embodiment.

FIG. 3 is a flow diagram of a process, in accordance with an embodiment herein.

FIG. 4 is a flow diagram of a process, in accordance with some embodiment herein.

DETAILED DESCRIPTION

Figure 5:
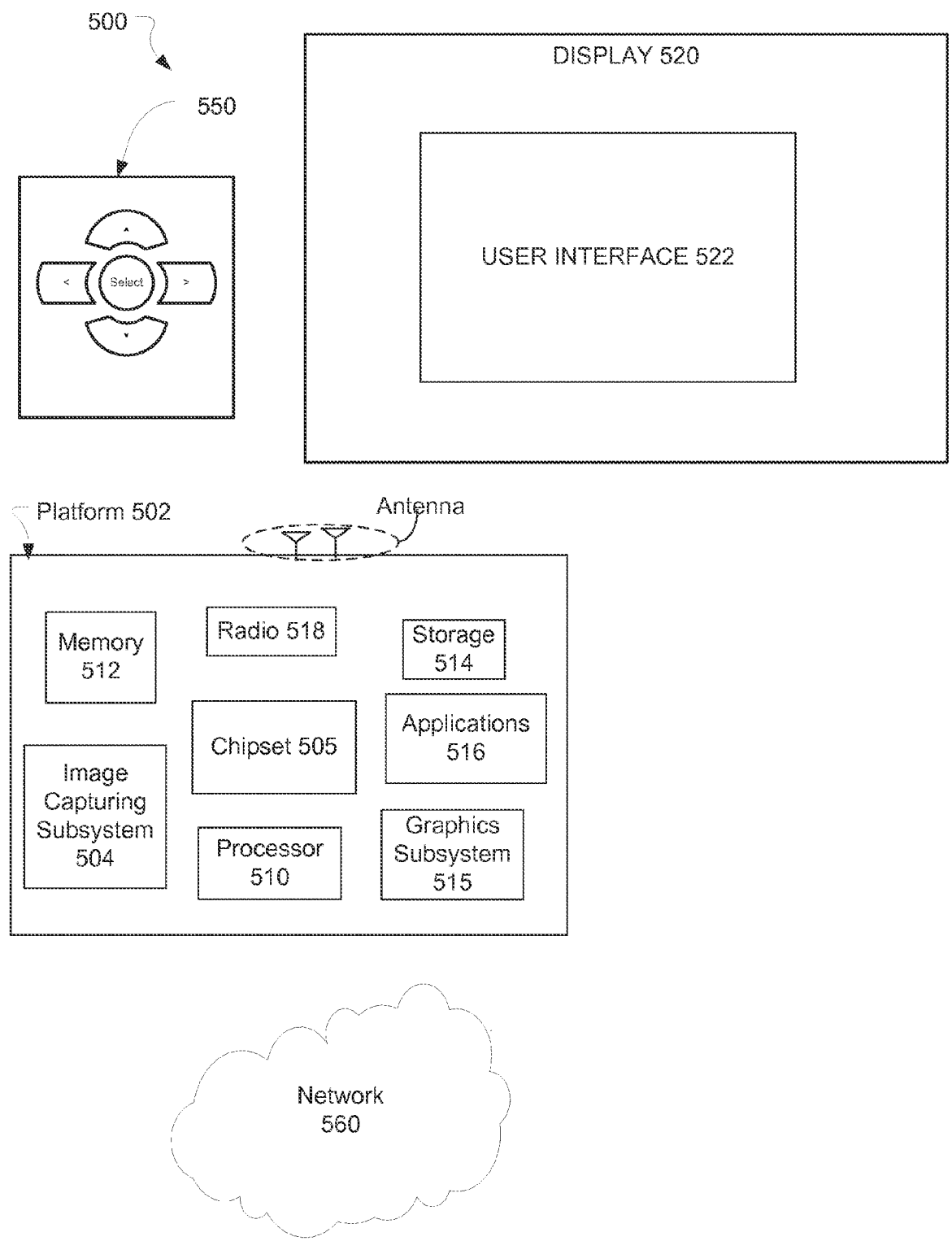
FIG. 5 illustrates a system, in accordance with some embodiments herein.

The following description describes an image acquisition and processing method, device, or system that may support processes and operations to improve efficiency and fidelity of representation of a scene acquired by a camera. The disclosure herein provides numerous specific details regarding a method and system for implementing the processes and operations. However, it will be appreciated by one skilled in the art(s) related hereto that embodiments of the present disclosure may be practiced without such specific details. Thus, in some instances aspects such as control mechanisms and full software instruction sequences have not been shown in detail in order not to obscure other aspects of the present disclosure. Those of ordinary skill in the art will be able to implement appropriate functionality without undue experimentation given the included descriptions herein.

References in the specification to "one embodiment", "some embodiments", "an embodiment", "an example embodiment", "an instance", "some instances" indicate that the embodiment described may include a particular feature, structure, or characteristic, but that every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Some embodiments herein may be implemented in hardware, firmware, software, or any combinations thereof. Embodiments may also be implemented as executable instructions stored on a machine-readable medium that may be read and executed by one or more processors. A machine-readable storage medium may include any tangible non-transitory mechanism for storing information in a form readable by a machine (e.g., a computing device). In some aspects, a machine-readable storage medium may include read only memory (ROM); random access memory (RAM); magnetic disk storage media; optical storage media; flash memory devices; and electrical and optical forms of signals. While firmware, software, routines, and instructions may be described herein as performing certain actions, it should be appreciated that such descriptions are merely for convenience and that such actions are in fact result from computing devices, processors, controllers, and other devices executing the firmware, software, routines, and instructions.

The present disclosure relates to methods and systems to create a representation of the scene in which image acquisition settings are automatically determined and used to acquire images of a particular scene. The number of images may be one for certain scenes, while multiple images may be acquired for other scenes to adequately capture the scene. The multiple images can then be combined to create an accurate or "perfect" shot of the scene. The representation of the "perfect" shot may contain more information than is present in any one individual image in the form of extended bit-depth, layered representation of focus layers etc. In general, different scenes may require different image acquisition settings for a camera. Factors relating to the scene may include the lighting of the scene, whether objects in the scene are stationary or non-stationary, how close the objects in the scene are to the camera, etc. Different cameras having different and distinct sensor and optics may also factor into the image acquisition settings used to generate the "perfect" shot of a given scene since the sensor and optics may impose certain limits specific to the camera. In some aspects, the output of a camera or other image acquisition device or system in some embodiments herein may include the combined "perfect" shot and the set of multiple images.

FIG. 1 is an illustration of an overall process according to some embodiments herein, generally referenced by reference number 100. In some embodiments, process 100 may be invoked by a camera, device, or system having an image capturing functionality (e.g., a tablet computing device, a portable media/multimedia player, etc.). In some aspects, process 100 may be initiated when the camera is functioning in a "fully automatic" mode of operation. As used herein, the fully automatic mode of operation may include a planning stage 105. Planning stage 105 may include operations to determine one or more image acquisition settings to use to capture a scene. Image acquisition stage 110 may then use the image acquisition settings determined at operation 105 to acquire a set of multiple images by the camera. The multiple images acquired at operation 115 may be output at operation 115. In some embodiments, the output may include a representation of a "perfect" shot resulting from combining the multiple images acquired at operation 115. In some instances the output may include the set of multiple images. The combined representation in the form of a "perfect" shot or the set of multiple images may be further processed or interacted with by an entity to, for example, obtain images with certain features/characteristics.

FIG. 2 is an illustrative depiction of a flow diagram of an image capturing process, generally represented by the reference number 200. Process 200 may be used to capture or acquire images, in accordance with one embodiment herein. Process 200 may include an operation 205 to automatically determine a plurality of image acquisition settings for a scene. In some embodiments, operation 205 may occur when the camera, device, or system including the processing functionality depicted in FIG. 2 is operating in a viewfinder mode (or the like). In some embodiments, the viewfinder mode may be invoked when the camera or camera function is turned on (i.e., a default mode). In some aspects, operation 205 may correspond to the planning stage of FIG. 1 and may include monitoring an input scene. The input scene may be a scene visible through or presented in the viewer finder of the camera. Based on the monitoring of the input scene by the camera's input sensors, optics, and/or processors, the camera may automatically determine how many images to acquire and what image acquisition settings or parameter values the camera should use to acquire the multiple images.

In some embodiments, the image acquisition settings or parameter values determined for use by the camera may be based on characteristics monitored and detected in one or more regions of the scene being monitored by the camera. For example, monitoring various regions of the scene may indicate that the scene includes very bright and very dark regions (i.e., the scene is high dynamic range, "HDR"); the scene includes regions at different depths from the camera such that all of the regions cannot be acquired in-focus with a single image capture setting or parameter value; the scene is likely to be "noisy" if acquired with a single image frame (e.g., the scene is too dark); and other scene characteristics.

Based on these and other potential scene characteristics, operation 205 may determine how many images to acquire and the image acquisition settings the camera should use to acquire the determined number of images. In some embodiments, the number of images to be acquired and the image acquisition settings with which the images are to be acquired are determined automatically by operation 205, without intervention or setting of any camera modes of operation by a user.

In some embodiments, the image acquisition settings or parameter values may include at least one of a focus setting, an aperture setting, an exposure setting, gain or ISO sensitivity setting, a white balance setting, a flash mode setting, resolution setting, an image quality setting, and other image acquisition settings and parameters.

In some embodiments, operation 205 may automatically determine the image acquisition settings or parameter values for one or more image acquisition or "camera" modes. As used herein, an image acquisition mode or camera mode may set or control certain image acquisition settings. In some aspects, the different image acquisition modes may place a priority on one or more of the image acquisition settings to achieve a particular imaging result or objective. For example, image acquisition modes may include, in some embodiments, a HDR mode, an all-in-focus mode, low light mode, an action or sports mode that increases ISO and uses faster shutter speeds, a macro mode, a night portrait mode, a shutter priority mode, an aperture priority mode, and other image acquisition modes.

In some embodiments, operation 205 may automatically determine the image acquisition settings or parameter values for more than one image acquisition or camera mode concurrently. That is, a camera or other device or system implementing process 200 may determine the image acquisition settings for multiple image acquisition modes simultaneously or in parallel. In this manner, the number of images to be acquired by the camera or device may be based on considerations for obtaining a "perfect" shot or image for multiple different image acquisition modes. As example, it may be determined for a particular scene that a first set of images should be acquired using a first range of image acquisition settings, it may also be determined that a second set of images should be acquired using a second range of image acquisition settings for an all-in-focus image acquisition mode, and it may further be determined that a third set of images should be acquired using a third range of image acquisition settings for an action mode. In some embodiments herein, the number of images and the image acquisition settings for the three image acquisition modes of the present example may be determined concurrently. In some instances, the three different sets of images may not necessarily be exclusive of each other.

Referring still to FIG. 2, process 200 proceeds to operation 210 to acquire the number of images using the image acquisition settings, as determined at operation 205. In some embodiments, operation 210 may correspond to aspects of operation 110 of FIG. 1 and may be referred to generally as an image acquisition mode of operation. In some embodiments, the camera, device, or system implementing process 200 captures the number of determined images in response to a single request to capture images. For example, a smartphone incorporating the functionality depicted in FIG. 2 may capture a "burst" or set of images in response to a user pressing a "capture" button (e.g., a hard or soft key) on the smartphone once. It is noted that the set of images will be acquired with the smartphone's camera (sub)system using the image acquisition settings determined at operation 205. In some embodiments, the set of acquired images includes images acquired using each of the multiple image acquisition modes.

In some embodiments, process 200 proceeds to operation 215 once the images have been captured at operation 210. In some embodiments, operation 215 may correspond to aspects of operation 115 of FIG. 1. At operation 215, the set of acquired images may be combined to generate a single representation (i.e., a "perfect" shot). The combined single shot may combine aspects from all of the acquired images or a subset of the set of acquired images. In some aspects, combining the set of acquired images to generate the combined single shot will result in a higher quality image than any one of the individual images in the set of acquired images. For example, the combined single shot may potentially be less noisy, more accurately represent high dynamic range, and include all of the elements of the scene in-focus as compared to any one of the individual images in the set of acquired images.

In some embodiments, the set of acquired images may be provided as an output of a process herein. FIG. 3 is an illustrative depiction of a flow diagram wherein the process 300 outputs the set of acquired images at operation 315. In some aspects, the operations 305 and 310 of FIG. 3 may be similar to operations 205 and 210 described above in connection with FIG. 2. Accordingly, an understanding of operations 305 and 310 may be had by referring to the disclosure of operations 205 and 210 above. The combined representation or the set of acquired images provided at operation 315 may be presented to an entity, in some instances, for further image processing and/or image manipulation. In some embodiments, the entity (e.g., a user or a processor based machine) may interact with the set of acquired images to, for example, re-create the captured scene by applying one or more image processes to the combined "perfect" shot representation or the set of acquired images. Interaction may include, for example, focusing the image within a region-of-interest, remapping the dynamic range within a region-of-interest to reveal maximum detail etc. FIG. 4 is an illustrative flow diagram of a process 400. Process 400 includes operations 405 and 410 that may be, in some aspects, similar to the operations 205 and 210 discussed in detail hereinabove. Process 400 illustrates an embodiment wherein a combined single image may be generated at operation 415. Operation 415 may be similar in some aspects to operation 215 of FIG. 2. Process 400 also illustrates that a set of images acquired at operation 410 in accordance with the determinations of operation 405 may be provided as an output at operation 420. In some embodiments, operation 420 may be similar in some aspects to operation 315 of FIG. 3. In some embodiments, operations 415 and 420 may be provided in combination.

In some embodiments, the image acquisition and processing processes disclosed herein may be implemented with or by a camera, device, or system including a camera function having non-specialized camera optics. That is, the image acquisition and processing processes disclosed herein may be compatible with existing, non-specialized or conventional camera optics and configurations, foregoing a need to manufacture or otherwise provide specialized camera optics.

In some embodiments, the image acquisition and processing processes disclosed herein may be provided as a hardware, software, and a combination thereof implementation. In some aspects, the processes and functionalities disclosed herein may be implemented in a camera, device, or system as an integrated function or application thereof, a third-party or after-market application or "app", and a service.

FIG. 5 illustrates an embodiment of a system 500. In embodiments, system 500 may be a media system although system 500 is not limited to this context. For example, system 500 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smartphone, smart tablet or smart television), mobile internet device (MID), messaging device, data communication device, and so forth.

In some embodiments, system 500 comprises a platform 502 coupled to a display 520. Platform 502 may receive content from a content device such as content services device(s) 530 or content delivery device(s) 540 or other similar content sources. A navigation controller 550 comprising one or more navigation features may be used to interact with, for example, platform 502 and/or display 520. Each of these components is described in more detail below.

In embodiments, platform 502 may comprise any combination of a chipset 505, processor 510, memory 512, storage 514, graphics subsystem 515, applications 516 and/or radio 518. Chipset 505 may provide intercommunication among processor 510, memory 512, storage 514, graphics subsystem 515, applications 516 and/or radio 518. For example, chipset 505 may include a storage adapter (not depicted) capable of providing intercommunication with storage 514.

Processor 510 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 510 may comprise dual-core processor(s), dual-core mobile processor(s), and so forth.

Memory 512 may be implemented as a volatile memory device such as, but not limited to, a Random Access Memory (RAM), Dynamic Random Access Memory (DRAM), or Static RAM (SRAM).

Storage 514 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 514 may comprise technology to increase the storage performance enhanced protection for valuable digital media when multiple hard drives are included, for example.

Graphics subsystem 515 may perform processing of images such as still or video for display. Graphics subsystem 515 may be a graphics processing unit (GPU) or a visual processing unit (VPU), for example. An analog or digital interface may be used to communicatively couple graphics subsystem 515 and display 520. For example, the interface may be any of a High-Definition Multimedia Interface, DisplayPort, wireless HDMI, and/or wireless HD compliant techniques. Graphics subsystem 515 could be integrated into processor 510 or chipset 505. Graphics subsystem 515 could be a stand-alone card communicatively coupled to chipset 505.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 518 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 518 may operate in accordance with one or more applicable standards in any version.

In embodiments, display 520 may comprise any television type monitor or display. Display 520 may comprise, for example, a computer display screen, touch screen display, video monitor, television-like device, and/or a television. Display 520 may be digital and/or analog. In embodiments, display 520 may be a holographic display. Also, display 520 may be a transparent surface that may receive a visual projection. Such projections may convey various forms of information, images, and/or objects. For example, such projections may be a visual overlay for a mobile augmented reality (MAR) application. Under the control of one or more software applications 516, platform 502 may display user interface 522 on display 520.

In embodiments, content services device(s) 530 may be hosted by any national, international and/or independent service and thus accessible to platform 502 via the Internet, for example. Content services device(s) 530 may be coupled to platform 502 and/or to display 520. Platform 502 and/or content services device(s) 530 may be coupled to a network 560 to communicate (e.g., send and/or receive) media information to and from network 560. Content delivery device(s) 540 also may be coupled to platform 502 and/or to display 520.

In embodiments, platform 502 may receive control signals from navigation controller 550 having one or more navigation features. The navigation features of controller 550 may be used to interact with user interface 522, for example. In embodiments, navigation controller 550 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 550 may be echoed on a display (e.g., display 520) by movements of a pointer, cursor, focus ring, or other visual indicators displayed on the display. For example, under the control of software applications 516, the navigation features located on navigation controller 550 may be mapped to virtual navigation features displayed on user interface 522, for example. In embodiments, controller 550 may not be a separate component but integrated into platform 502 and/or display 520. Embodiments, however, are not limited to the elements or in the context shown or described herein.

In various embodiments, any one or more of the components shown in system 500 may be integrated.

In various embodiments, system 500 may be implemented as a wireless system, a wired system, or a combination of both. When implemented as a wireless system, system 500 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 500 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 502 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 5.

Figure 6:
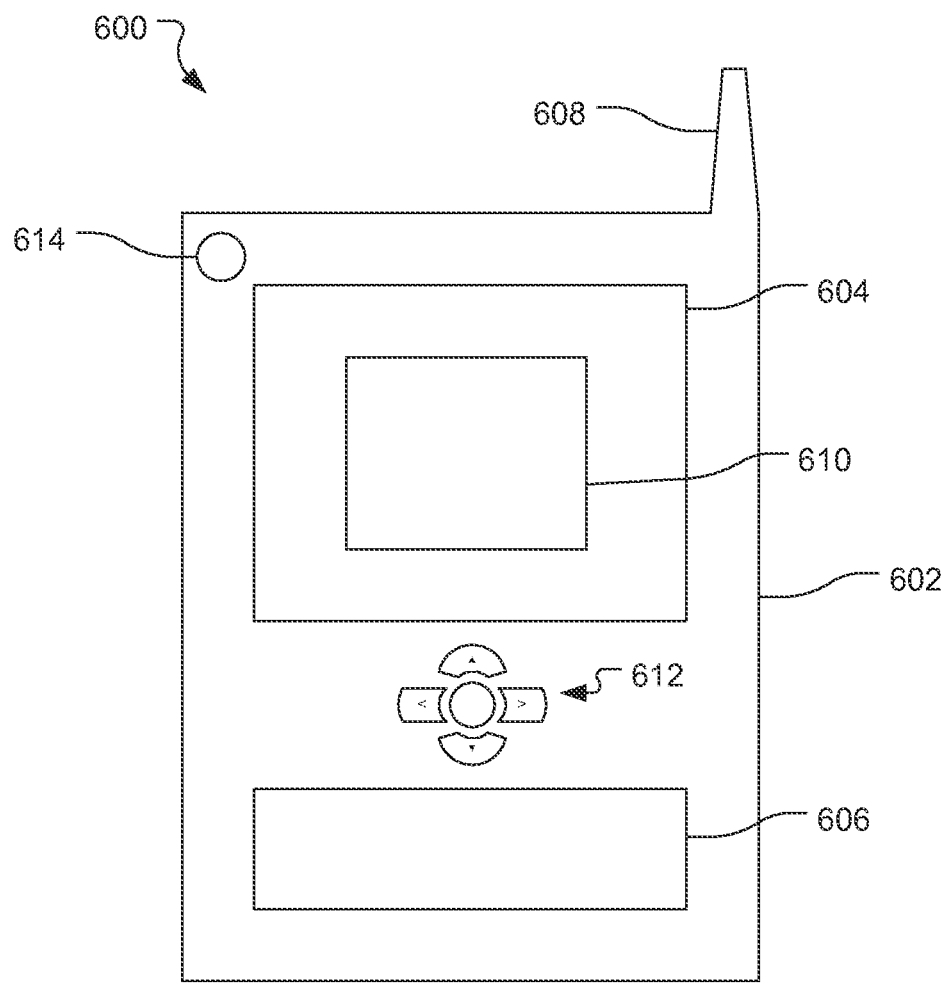
FIG. 6 is an illustration of an embodiment of the system of FIG. 4, according to an embodiment herein.

As described above, system 500 may be embodied in varying physical styles or form factors. FIG. 6 illustrates embodiments of a small form factor device 600 in which system 500 may be embodied. In embodiments, for example, device 600 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 6, device 600 may comprise a housing 602, a display 604 for displaying image 610, an input/output (I/O) device 606, an antenna 608, and a camera lens coupled to a camera (sub)system (not shown). Device 600 also may comprise navigation features 612. Display 604 may comprise any suitable display unit for displaying information appropriate for a mobile computing device. I/O device 606 may comprise any suitable I/O device for entering information into a mobile computing device. Examples for I/O device 606 may include an alphanumeric keyboard, a numeric keypad, a touch pad, input keys, buttons, switches, rocker switches, microphones, speakers, voice recognition device and software, and so forth. Information also may be entered into device 600 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

All systems and processes discussed herein may be embodied in program code stored on one or more computer-readable media. Such media may include, for example, a floppy disk, a CD-ROM, a DVD-ROM, one or more types of "discs", magnetic tape, a memory card, a flash drive, a solid state drive, and solid state Random Access Memory (RAM) or Read Only Memory (ROM) storage units. Embodiments are therefore not limited to any specific combination of hardware and software.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A method, comprising:
monitoring an input scene, via a camera in a fully automatic mode of operation, to determine that the input scene requires a plurality of multiple image acquisition camera modes to capture the input scene; and
automatically generating a singleshot representation of the input scene by:
automatically determining a first camera mode from a plurality of fully automatic modes of operation wherein each of the fully automatic modes of operation control image acquisition settings;
determining automatically, in the first determined fully automatic mode of operation, image acquisition settings for the input scene that causes a first plurality of image acquisition settings;
automatically determining a second camera mode from the plurality of fully automatic modes of operation;
determining automatically, in the second determined fully automatic mode of operation, image acquisition settings for the input a scene that causes a second plurality of image acquisition settings;
acquiring a set of images of the input scene, the set of images comprising multiple images captured using the first camera mode and the second camera mode; and
generating the singleshot representation of the input scene by combining the acquired set of images.

2. The method of claim 1, further comprising storing the acquired set of images.

3. The method of claim 1, further comprising providing an output of the acquired set of images.

4. The method of claim 1, wherein the set of images comprising multiple images captured using the first camera mode and the second camera mode are automatically acquired in response to a single request to capture the input scene.

5. The method of claim 1, wherein the first determined fully automatic mode comprises an HDR mode and the second determined fully automatic mode comprises an all-in-focus mode.

6. A system, comprising:
a memory having processor executable instructions stored thereon; and
a processor in communication with the memory to execute the instructions to:
monitor an input scene, via a camera in a fully automatic mode of operation, to determine that the input scene requires a plurality of multiple image acquisition camera modes to capture the input scene; and
automatically generate a singleshot representation of the input scene by:
automatically determine a first camera mode from a plurality of fully automatic modes of operation wherein each of the fully automatic modes of operation control image acquisition settings;
determine automatically, in the first determined fully automatic mode of operation, image acquisition settings for the input scene that causes a first plurality of image acquisition settings;
automatically determine a second camera mode from the plurality of fully automatic modes of operation;
determine automatically, in the second determined fully automatic mode of operation, image acquisition settings for the input scene that causes a second plurality of image acquisition settings;
acquire a set of images of the input scene, the set of images comprising multiple images captured using the first camera mode and the second camera mode; and
generate the singleshot representation of the input scene by combining the acquired set of images.

7. The system of claim 6, wherein the processor further executes instructions to store the acquired set of images.

8. The system of claim 6, wherein the processor further executes instructions to provide an output of the acquired set of images.

9. The system of claim 6, wherein the set of images comprising multiple images capturing using the first camera mode and the second camera mode are automatically acquired in response to a single request to capture the input scene.

10. The system of claim 6, wherein the first determined fully automatic mode comprises an HDR mode and the second determined fully automatic mode comprises an all-in-focus mode.

11. The system of claim 6, wherein the single shot representation and the acquired set of images are further processed to allow a user to interactively view the scene.

12. A non-transitory computer-readable medium storing processor-executable instructions thereon for controlling a processor, the medium comprising:

instructions to monitor an input scene, via a camera in a fully automatic mode of operation, to determine that the input scene requires a plurality of multiple image acquisition camera modes to capture the input scene; and instructions to automatically generate a singleshot representation of the input scene by:

instructions to automatically determine a first camera mode from a plurality of fully automatic modes of operation wherein each of the fully automatic modes of operation control image acquisition settings;

instructions to determine automatically, in the first determined fully automatic mode of operation, image acquisition settings for the input scene that causes a first plurality of image acquisition settings;

instructions to automatically determine a second camera mode from the plurality of fully automatic modes of operation;

instructions to determine automatically, in the second determined fully automatic mode of operation, image acquisition settings for the input scene that causes a second plurality of image acquisition settings;

instructions to acquire a set of images of the input scene, the set of images comprising multiple images captured using the first camera mode and the second camera mode; and instructions to generate the singleshot representation of the input scene by combining the acquired set of images.

13. The non-transitory medium of claim 12, wherein the medium further comprises instructions to store the acquired set of images.

14. The medium of claim 12, wherein the medium further comprises instructions to provide an output of the acquired set of images.

15. The non-transitory medium of claim 12, wherein the medium further comprises instructions to automatically acquire the set of images comprising multiple images captured using the first camera mode and the second camera mode in response to a single request to capture the input scene.

16. The non-transitory medium of claim 12, wherein the first determined fully automatic mode comprises an HDR mode and the second determined fully automatic mode comprises an all-in-focus mode.

17. The method of claim 1, wherein the image acquisition settings associated with the first determined fully automatic mode of operation and the second determined fully automatic mode of operation are determined simultaneously.

* * * * *